US 9,139,779 B2

(12) United States Patent
Onishi et al.

(10) Patent No.: US 9,139,779 B2
(45) Date of Patent: Sep. 22, 2015

(54) CATALYST SEPARATION SYSTEM

(75) Inventors: Yasuhiro Onishi, Tokyo (JP); Yuzuru Kato, Tokyo (JP); Eiichi Yamada, Tokyo (JP); Kentarou Morita, Tokyo (JP)

(73) Assignees: JAPAN OIL, GAS AND METALS NATIONAL CORPORATION, Kanagawa (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 59 days.

(21) Appl. No.: 12/998,217

(22) PCT Filed: Sep. 25, 2009

(86) PCT No.: PCT/JP2009/004896
§ 371 (c)(1),
(2), (4) Date: May 4, 2011

(87) PCT Pub. No.: WO2010/038400
PCT Pub. Date: Apr. 8, 2010

(65) Prior Publication Data
US 2011/0200492 A1 Aug. 18, 2011

(30) Foreign Application Priority Data
Sep. 30, 2008 (JP) .................. 2008-254816

(51) Int. Cl.
B01J 8/22 (2006.01)
C10G 2/00 (2006.01)
B01J 8/00 (2006.01)

(52) U.S. Cl.
CPC ................. *C10G 2/342* (2013.01); *B01J 8/006* (2013.01); *B01J 8/22* (2013.01); *C10G 2/32* (2013.01)

(58) Field of Classification Search
None
See application file for complete search history.

(56) References Cited

U.S. PATENT DOCUMENTS 4,057,496 A * 11/1977 Itagaki .......................... 210/771
4,376,705 A * 3/1983 Komura et al. ............... 210/413
(Continued)

FOREIGN PATENT DOCUMENTS

| CN | 1739846 | 3/2006 |
|---|---|---|
| CN | 101229499 | 7/2008 |

(Continued)

OTHER PUBLICATIONS

Krishna et al., "Design and scale-up of the Fischer-Tropsch bubble column slurry reactor", Fuel Processing Technology, vol. 64, No. 1-3, 2000, pp. 73-105.
(Continued)

Primary Examiner — Jennifer A Leung
(74) Attorney, Agent, or Firm — Kenyon and Kenyon LLP

(57) ABSTRACT

A catalyst separation system which separates catalyst particles from liquid hydrocarbons synthesized by a chemical reaction of a synthesis gas including a hydrogen and a carbon monoxide as the main components, and a slurry having solid catalyst particles suspended in a liquid, the catalyst separation system is provided with: a reactor; a storage tank which stores the slurry drawn from the reactor; a plurality of filters which filters the slurry; and a filtrate recovery vessel which recovers a filtrate which has passed through the plurality of filters, wherein the plurality of filters is disposed in series in a flow line for the slurry from the storage tank to the filtrate recovery vessel.

6 Claims, 4 Drawing Sheets

(56) References Cited

U.S. PATENT DOCUMENTS

| | | | |
|---|---|---|---|
| 4,592,835 A * | 6/1986 | Grieder et al. | 210/107 |
| 6,887,390 B2 * | 5/2005 | Mohedas et al. | 210/777 |
| 6,974,842 B1 | 12/2005 | Spena et al. | |
| 2004/0256321 A1 * | 12/2004 | Goldsmith | 210/650 |
| 2004/0266894 A1 * | 12/2004 | Belmonte et al. | 518/726 |
| 2006/0111232 A1 * | 5/2006 | Spena et al. | 502/29 |

FOREIGN PATENT DOCUMENTS

| | | |
|---|---|---|
| JP | 06-017154 | 1/1994 |
| JP | 8-510681 | 11/1996 |
| JP | 2002-066220 | 3/2002 |
| JP | 2007-516065 | 6/2007 |
| RU | 2220938 | 1/2004 |
| RU | 2363532 | 8/2009 |
| WO | WO 9006798 A1 * | 6/1990 |
| WO | 92/12783 | 8/1992 |
| WO | WO 94/28208 | 12/1994 |
| WO | WO 2005/005038 | 1/2005 |

OTHER PUBLICATIONS

Neathery et al., "A Comparison of Fischer-Tropsch Synthesis in a Slurry Bubble Column Reactor and a Continuous Stirred Tank Reactor" Studies in Surface Science and Catalysis, vol. 139, 2001, pp. 407-414.

International Search Report dated Oct. 27, 2009 issued in corresponding PCT Application No. PCT/JP2009/004896.

European Search Report, dated Apr. 16, 2012, issued in corresponding European application No. 09817443.6.

Neathery et al., "Separation of Fischer-Tropsch Wax Products from Ultrafine Iron Catalyst Particles," The University of Kentucky Centre for Applied Energy Research, Dec. 31, 2004, DE-FC26-03NT41965.

Uzbekistani Office Action, dated Dec. 24, 2012, issued in corresponding Uzbekistani application No. IAP20110120, and an English translation thereof.

Chinese Office Action, dated Feb. 5, 2013, issued in corresponding Chinese application No. 200980138048.6, and an English translation thereof.

* cited by examiner

CATALYST SEPARATION SYSTEM

TECHNICAL FIELD

The present invention relates to a catalyst separation system which separates catalyst particles to recover hydrocarbons.

This application is a national stage application of International Application No. PCT/JP2009/004896, filed Sep. 25, 2009, which claims priority Japanese Patent Application No. 2008-254816, filed Sep. 30, 2008, the content of which is incorporated herein by reference.

BACKGROUND ART

As one method for synthesizing liquid fuels from a natural gas, a GTL (Gas To Liquids: liquid fuel synthesis) technique of reforming a natural gas to produce a synthesis gas containing a carbon monoxide gas (CO) and a hydrogen gas ($H_2$) as the main components, synthesizing hydrocarbons using a catalyst with this synthesis gas as a source gas by the Fischer-Tropsch synthesis reaction (hereinafter referred to as "FT synthesis reaction"), and further hydrogenating and refining the hydrocarbons to produce liquid fuel products, such as naphtha (raw gasoline), kerosene, gas oil, and wax, has recently been developed.

Various apparatuses have been studied in order to separate and recover catalyst particles from the liquid hydrocarbons including the catalyst particles which have deteriorated due to the reaction heat generated by the FT synthesis reaction, the friction with the inner wall of a flow line, the other external factors, etc.

As one of the apparatuses, for example, a recovery system shown in Patent Document 1 can be utilized. This apparatus first heats the hydrocarbons including the catalyst particles inside a rotary kiln set in a heat chamber, and separates them into gasified hydrocarbons discharged in the axial direction from the middle part of the rotary kiln and catalyst particles discharged from an outer peripheral portion of the rotary kiln. Then, the gasified hydrocarbons are cooled down, condensed, and recovered by a cooling tower.

Further, as another apparatus, an apparatus is known which pressurizes the liquid hydrocarbons including the catalyst particles, filters the liquid hydrocarbons by a single filter, and catches the catalyst particles larger than the diameter of pores formed in the filter, thereby separating the catalyst particles from the liquid hydrocarbons.

CITATION LIST

Patent Document

[Patent Document 1] Japanese Patent Unexamined Publication No. 6-17154

SUMMARY OF THE INVENTION

Problem that the Invention is to Solve

However, when the catalyst particles are separated and recovered from the slurry including the liquid hydrocarbons, since it is necessary to provide the heat chamber and the cooling tower in a method shown in the above Patent Document 1, there is a problem in that the apparatus becomes large as a whole. Further, in the apparatus which separates the catalyst particles by the above filter, there is a possibility that the catalyst particles may pass through the filter when the catalyst particles with a small particle size are filtered, and the quality of liquid hydrocarbons to be recovered may deteriorate.

The present invention was made in view of such a problem, and the object thereof is to provide a catalyst separation system which can suppress the enlargement of apparatuses, and deterioration of the hydrocarbons, thereby separating and recovering catalyst particles from the slurry including the liquid hydrocarbons.

Means for Solving the Problem

In order to solve the above problem, the present invention suggests the following means.

The catalyst separation system of the present invention is a catalyst separation system which separates catalyst particles from liquid hydrocarbons synthesized by a chemical reaction of a synthesis gas including a hydrogen and a carbon monoxide as the main components, and a slurry having solid catalyst particles suspended in a liquid, the catalyst separation system is provided with: a reactor, a storage tank which stores the slurry drawn from the reactor, a plurality of filters which filters the slurry; and a filtrate recovery vessel which recovers the filtrate which has passed through the plurality of filters, wherein the plurality of filters is disposed in series along a flow line for the slurry from the storage tank to the filtrate recovery vessel.

Further, in the catalyst separation system, the chemical reaction may be a FT synthesis reaction.

According to the present invention, the slurry including the catalyst particles flowed from the reactor body can be filtered multiple times by the filters provided from the upstream of the second flow line to the downstream thereof. For this reason, when the catalyst particles are separated and recovered from the slurry including the liquid hydrocarbons, the catalyst particles can be reliably prevented from being mixed into the liquid hydrocarbons to be recovered, and deterioration of the hydrocarbon products can be suppressed. Further, since the catalyst particles are separated from the slurry by a plurality of filters, it becomes unnecessary to separately provide accessory devices, such as a heat chamber and a cooling tower or a condenser. Therefore, it is possible to keep the system from being enlarged as a whole.

Further, in the catalyst separation system, the pore diameter of the filter provided upstream of the flow line may be greater than the pore diameter of the filter provided downstream of the flow line among the plurality of filters.

According to the present invention, if all of the pore diameters of the plurality of filters are the same, the pores of the upstream filter will first be clogged by the catalyst particles. The catalyst separation system of the present invention is configured so that the pore diameter of the filter provided downstream of the second flow passage is smaller than the pore diameter of the filter provided upstream of the second flow line. For this reason, although the catalyst particles with a relatively small external diameter which have passed through the pores of the neighboring upstream filter clog the filter disposed downstream, the catalyst particles that are larger than the pore diameter of the upstream filter clog the upstream filter with a large pore diameter. In this way, the external diameter of the catalyst particles to be clogged will differ depending on filters. Accordingly, the catalyst particles can be prevented from clogging only the upstream filter unevenly, and thus, the slurry including the catalyst particles can be prevented from blocking the second flow line to hinder flow.

Further, in the catalyst separation system, at least one of the plurality of filters may be a Nutsche filter.

In addition, the Nutsche filter referred to here means a filter of the type which performs suctioning and filtering by a vacuum pump or the like from one side of cloth or a wire screen, or a filter of the type which performs filtering by pressurization from the other side.

According to the present invention, the catalyst particles in the slurry can be effectively filtered.

Further, in the catalyst separation system, a filter nearest to the filtrate recovery vessel among the plurality of filters may be made of sintered metal.

In addition, the filter made of sintered metal referred to here means a filter which is obtained by overlapping metallic powder or nets, and heat-treating to bind the metallic powder or nets at a temperature below the melting point of the metal.

According to the present invention, even the catalyst particles with a small external diameter, several micrometers, can be caught by the filters.

Further, in the catalyst separation system, the plurality of filters may have a first filter which filters the slurry drawn from the storage tank, and a plurality of second filters which filters the slurry which has passed through the first filter, wherein a portion of the flow line may branch in parallel, the plurality of second filters may be provided in each branched flow line, and a switching device may be provided in the flow line such that the slurry is selectively flowed into the plurality of second filters.

According to the present invention, for example, when the catalyst particles clog the pores of the filter and the slurry becomes difficult to flow while the slurry is made to flow to one branch flow line, it is possible to switch the branch flow lines which allows the slurry to flow to another branch flow line by the switching device. Accordingly, even when the catalyst particles have clogged the pores of the filter, replacement with a new filter can be made without stopping the flow of the slurry.

Advantage of the Invention

According to the catalyst separation system of the present invention, it is possible to suppress the enlargement of the apparatuses, and deterioration of the hydrocarbons, thereby separating and recovering catalyst particles from the slurry including the liquid hydrocarbons.

MODE FOR CARRYING OUT THE INVENTION (First Embodiment)

Hereinafter, a first embodiment of a catalyst separation system according to the present invention will be described with reference to FIGS. 1 to 3.

Figure 1:
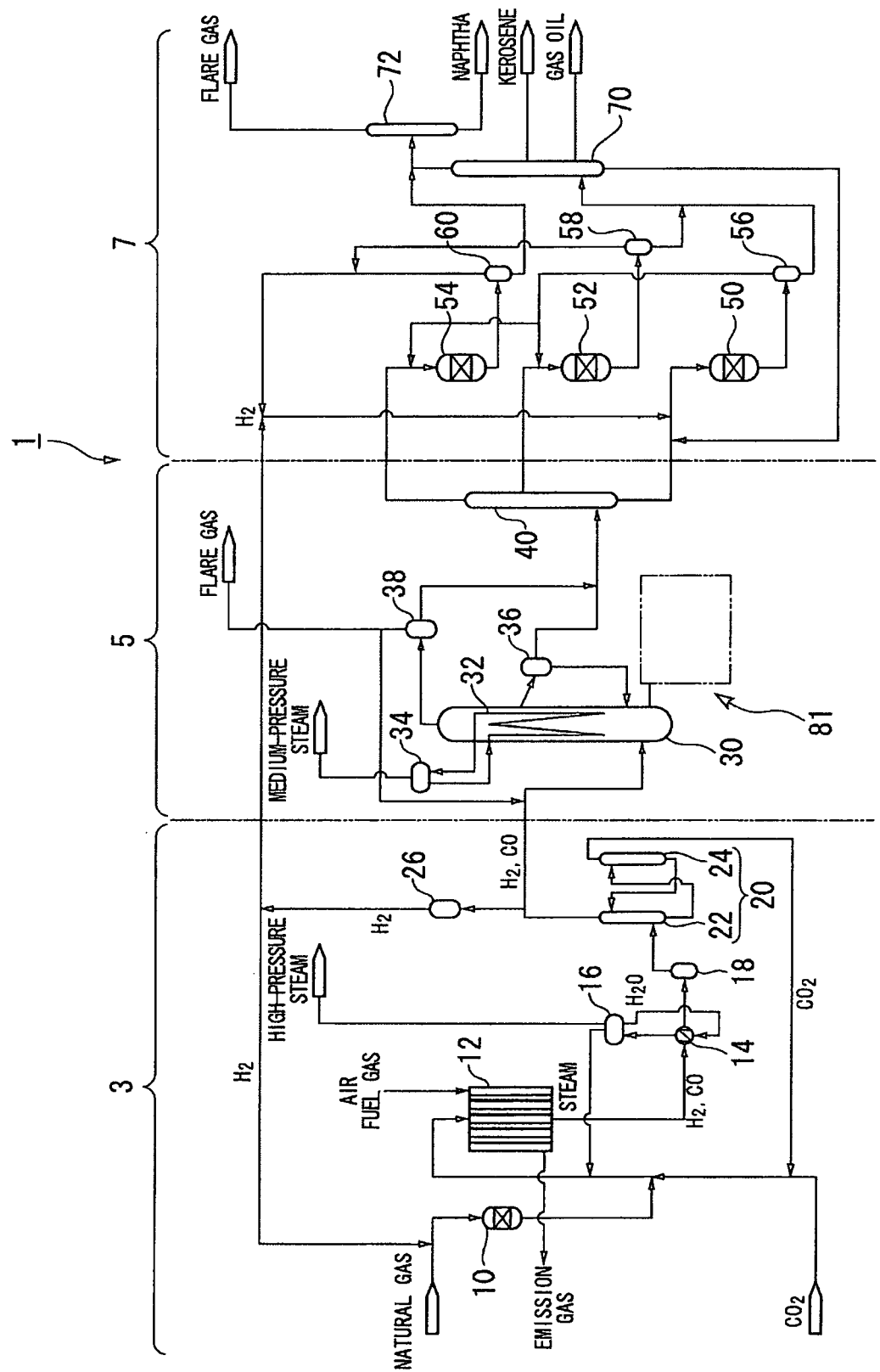
FIG. 1 is a schematic diagram showing the overall configuration of a liquid fuel synthesizing system using a catalyst separation system of a fust embodiment of the present invention.

FIG. 1 is a schematic diagram showing the overall configuration of a liquid fuel synthesizing system 1 which synthesizes liquid fuels from a hydrocarbon feedstock, such as a natural gas, using a catalyst separation system 81 of the present invention. The liquid fuel synthesizing system 1 is a plant facility which carries out the GTL process which converts a hydrocarbon feedstock, such as natural gas, into liquid fuels. The catalyst separation system 81 is, for example, a system which is used when individual units which produce liquid-fuel products (which will be described later) of the liquid fuel synthesizing system 1 have stopped their operation, and which separates and recovers catalyst particles from a slurry including liquid hydrocarbons synthesized by a chemical reaction of a synthesis gas including a hydrogen gas and a carbon monoxide gas as the main components, and a slurry having solid catalyst particles suspended in a liquid.

As shown in FIG. 1, the liquid fuel synthesizing system 1 includes a synthesis gas production unit 3, an FT synthesis unit 5, and an upgrading unit 7. The synthesis gas production unit 3 reforms a natural gas, which is a hydrocarbon feedstock, to produce a synthesis gas including a carbon monoxide gas and a hydrogen gas. The FT synthesis unit 5 produces liquid hydrocarbons from the produced synthesis gas by the Fischer-Tropsch synthesis reaction. The upgrading unit 7 hydrogenates and refines the liquid hydrocarbons produced by the FT synthesis reaction to produce liquid fuel products (naphtha, kerosene, gas oil, wax, etc.). Hereinafter, components of each of these units will be described.

First, the synthesis gas production unit 3 will be described. The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26. The desulfurizing reactor 10 is composed of a hydrodesulfurizer, etc., and removes sulfur components from a natural gas as a feedstock. The reformer 12 reforms the natural gas supplied from the desulfurizing reactor 10, to produce a synthesis gas including a carbon monoxide gas (CO) and a hydrogen gas ($H_2$) as the main components. The waste heat boiler 14 recovers waste heat of the synthesis gas produced in the reformer 12, to produce high-pressure steam. The vapor-liquid separator 16 separates the water heated by heat exchange with the synthesis gas in the waste heat boiler 14 into a vapor (high-pressure steam) and a liquid. The vapor-liquid separator 18 removes a condensate from the synthesis gas cooled down in the waste heat boiler 14, and supplies a gas to the $CO_2$ removal unit 20. The $CO_2$ removal unit 20 has an absorption tower 22 which removes carbon dioxide gas by using an absorbent from the synthesis gas supplied from the vapor-liquid separator 18, and a regeneration tower 24 which desorbs the a carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 is not necessarily provided depending on circumstances.

Among them, the reformer 12 reforms a natural gas by using a carbon dioxide and a steam to produce a high-temperature synthesis gas including a carbon monoxide gas and a hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (PDX) using oxygen, an autothermal reforming method (ATR) that is a combination of the partial oxidation method and the steam reforming method, a carbon-dioxide-gas reforming method, and the like can also be utilized.

$$CH_4 + H_2O \rightarrow CO + 3H_2 \qquad (1)$$

$$CH_4 + CO_2 \rightarrow 2CO + 2H_2 \qquad (2)$$

Further, the hydrogen separator 26 is provided on a branch line branched from a main line which connects the $CO_2$ removal unit 20 or vapor-liquid separator 18 with the bubble column reactor 30. This hydrogen separator 26 may be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption towers (not shown) which is arranged in parallel. By sequentially repeating processes including pressurizing, adsorption, desorption (pressure reduction), and purging of hydrogen in each of the adsorption towers, a high-purity (for example, about 99.999%) hydrogen gas separated from the synthesis gas can be continuously supplied.

In addition, the hydrogen gas separating method in the hydrogen separator 26 is not limited to the example of the pressure swing adsorption method as in the above hydrogen PSA device. For example, it may be a hydrogen storing alloy adsorption method, a membrane separation method, or a combination thereof.

The hydrogen storing alloy method is, for example, a technique of separating hydrogen gas using a hydrogen storing alloy (TiFe, $LaNi_5$, $TiFe_{0.7-0.9}$, $Mn_{0.3-0.1}$, $TiMn_{1.5}$, etc.) having a property which adsorbs or emits hydrogen by being cooled or heated. By providing a plurality of adsorption towers in which a hydrogen storing alloy is contained, and alternately repeating, in each of the adsorption towers, adsorption of hydrogen by cooling of the hydrogen storing alloy and emission of hydrogen by heating of the hydrogen storing alloy, hydrogen gas in the synthesis gas can be separated and recovered.

Further, the membrane separation method is a technique of separating hydrogen gas having excellent membrane permeability out of a mixed gas, using a membrane made of a polymeric material, such as aromatic polyimide. Since this membrane separation method is not accompanied with a phase change, less energy for running is required, and the running cost is low. Further, since the structure of a membrane separation device is simple and compact, the facility cost required is low, and the facility area required is smaller. Moreover, since there is no driving device in a separation membrane, and a stable running range is wide, there is an advantage in that maintenance and management is easy.

Next, the FT synthesis unit 5 will be described. The FT synthesis unit 5 mainly includes, for example, the bubble column reactor (reactor body) 30, a vapor-liquid separator 34, a separator 36, a vapor-liquid separator 38, and a first fractionator 40. The bubble column reactor 30 carries out the FT synthesis reaction of the synthesis gas produced in the above synthesis gas production unit 3, i.e., a carbon monoxide gas and a hydrogen gas, to produce hydrocarbons. The vapor-liquid separator 34 separates the water flowed and heated through a heat transfer pipe 32 disposed in the bubble column reactor 30 into a steam (medium-pressure steam) and a liquid. The separator 36 is connected to a middle part of the bubble column reactor 30 to separate a catalyst and a liquid hydrocarbon product. The vapor-liquid separator 38 is connected to the top of the bubble column reactor 30 to cool down an unreacted synthesis gas and gaseous hydrocarbon products. The first fractionator 40 distills the liquid hydrocarbons supplied via the separator 36 and the vapor-liquid separator 38 from the bubble column reactor 30, and separates and refines the liquid hydrocarbons into individual fractions according to boiling points.

Among them, the bubble column reactor 30, which is an example of a reactor which synthesizes liquid hydrocarbons from a synthesis gas, functions as an FT synthesis reactor which synthesizes liquid hydrocarbons from the synthesis gas by the FT synthesis reaction. The bubble column reactor 30 is composed of, for example, a bubble column slurry bed type reactor in which a slurry consisting mainly of catalyst particles and medium oil is contained inside a tower type container. This bubble column reactor 30 produces gaseous or liquid hydrocarbons from the synthesis gas by the FT synthesis. In detail, in this bubble column reactor 30, the synthesis gas that is a source gas is supplied as bubbles from a sparger at the bottom of the bubble column reactor 30, and passes through the slurry, and in a suspended state, a hydrogen gas and a carbon monoxide gas undergo a synthesis reaction, as shown in the following chemical reaction formula (3).

$$2nH_2 + nCO \rightarrow (-CH_2-)_n + nH_2O \qquad (3)$$

In addition, the catalyst particles may deteriorate due to the heat generated during the FT synthesis reaction, the friction with the inner wall of a flow line, etc. Further, since this FT synthesis reaction is an exothermic reaction, the bubble column reactor 30, which is a heat exchanger type reactor within which the heat transfer pipe 32 is disposed, is adapted such that, for example, water (BFW: Boiler Feed Water) is supplied as a coolant so that the reaction heat of the above FT synthesis reaction can be recovered as a medium-pressure steam by the heat exchange between the slurry and the water.

Finally, the upgrading unit 7 will be described. The upgrading unit 7 includes, for example, a wax fraction hydrocracking reactor 50, a kerosene and gas oil fraction hydrotreating reactor 52, a naphtha fraction hydrotreating reactor 54, vapor-liquid separators 56, 58 and 60, a second fractionator 70, and a naphtha stabilizer 72. The wax fraction hydrocracking reactor 50 is connected to the bottom of the first fractionator 40. The kerosene and gas oil fraction hydrotreating reactor 52 is connected to the middle part of the first fractionator 40. The naphtha fraction hydrotreating reactor 54 is connected to an upper part of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70. Then the naphtha stabilizer 72 discharges butane and components lighter than butane as a flare gas, and separates and recovers components having a carbon number of five or more as a naphtha product.

Next, a process (GTL process) of synthesizing liquid fuel from a natural gas by the liquid fuel synthesizing system 1 configured as above will be described.

A natural gas (whose main component is $CH_4$) as a hydrocarbon feedstock is supplied to the liquid fuel synthesizing system 1 from an external natural gas supply source (not shown), such as a natural gas field or a natural gas plant. The above synthesis gas production unit 3 reforms this natural gas to produce a synthesis gas (mixed gas including a carbon monoxide gas and a hydrogen gas as main components).

Specifically, first, the above natural gas is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, with, for example, a ZnO catalyst. By desulfurizing the natural gas in advance in this way, it is possible to prevent deactivation of catalysts used in the reformer 12, the bubble column reactor 30, etc. by sulfur components.

The natural gas (may also contain a carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed therewith. The reformer 12 reforms a natural gas by using a carbon dioxide and a steam to produce a high-temperature synthesis gas including a carbon monoxide gas and a hydrogen gas as the main components, by a steam and carbon-dioxide-gas reforming method. At this time, the reformer 12 is supplied with, for example, a fuel gas for a burner disposed in the reformer 12 and air, and the reaction heat required for the above steam and $CO_2$ reforming reaction, which is an endothermic reaction is provided with the heat of combustion of the fuel gas in the burner.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as a high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after a condensate is separated and removed from the synthesis gas in the vapor-liquid separator 18. The absorption tower 22 absorbs a carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, a steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2:CO=2:1$ (molar ratio)) suitable for the FT synthesis reaction. In addition, the pressure of the synthesis gas supplied to the bubble column reactor 30 is raised to a pressure (for example, about 3.6 MPaG) suitable for the FT synthesis reaction by a compressor (not shown) provided in a pipe which connects the $CO_2$ removal unit 20 with the bubble column reactor 30.

Further, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the kerosene and gas oil fraction hydrotreating reactor 52, the naphtha fraction hydrotreating reactor 54, etc.) which perform predetermined reactions utilizing the hydrogen within the liquid fuel synthesizing system 1.

Next, the above FT synthesis unit 5 synthesizes liquid hydrocarbons by the FT synthesis reaction from the synthesis gas produced by the above synthesis gas production unit 3.

Specifically, the synthesis gas from which the carbon dioxide gas has been separated from in the above $CO_2$ removal unit 20 flows in from the bottom of the bubble column reactor 30, and flows up in the catalyst slurry contained in the bubble column reactor 30. At this time, within the bubble column reactor 30, the carbon monoxide gas and hydrogen gas which are included in the synthesis gas react with each other by the FT synthesis reaction, thereby producing hydrocarbons. Moreover, by flowing water through the heat transfer pipe 32 of the bubble column reactor 30 at the time of this synthesis reaction, the reaction heat of the FT synthesis reaction is removed, and the water heated by this heat exchange is vaporized into a steam. As for this steam, the water liquefied in the vapor-liquid separator 34 is returned to the heat transfer pipe 32, and a gas component is supplied to an external device as a medium-pressure steam (for example, 1.0 to 2.5 MPaG).

The liquid hydrocarbons synthesized in the bubble column reactor 30 in this way are drawn from the middle part of the bubble column reactor 30, and are introduced to the separator 36. The separator 36 separates a catalyst (solid component), and a liquid component including a liquid hydrocarbon product in the drawn slurry. A part of the separated catalyst is supplied to the bubble column reactor 30, and the liquid component is supplied to the first fractionator 40. From the top of the bubble column reactor 30, an unreacted synthesis gas, and a gas component of the synthesized hydrocarbons are introduced into the vapor-liquid separator 38. The vapor-liquid separator 38 cools down these gases to separate some condensed liquid hydrocarbons to introduce them into the first fractionator 40. Meanwhile, as for the gas component separated in the vapor-liquid separator 38, the unreacted synthesis gas (CO and $H_2$) is returned to the bottom of the bubble column reactor 30, and is reused for the FT synthesis reaction. Further, the emission gas (flare gas) other than the target products, including as the main component hydrocarbon gas having a small carbon number ($C_4$ or less), is introduced into an external combustion facility (not shown), is combusted therein, and is then emitted to the atmosphere.

Next, the first fractionator 40 heats the liquid hydrocarbons (whose carbon numbers are various) supplied via the separator 36 and the vapor-liquid separator 38 from the bubble column reactor 30 as described above, to fractionally distill the liquid hydrocarbons using a difference in boiling points. Thereby, the first fractionator 40 separates and refines the liquid hydrocarbons into a naphtha fraction (whose boiling point is lower than about 150° C.), a kerosene and gas oil fraction (whose boiling point is about 150 to 350° C.), and a wax fraction (whose boiling point is higher than about 350° C.). The liquid hydrocarbons (mainly $C_{21}$ or more) as the wax fraction drawn from the bottom of the first fractionator 40 are transferred to the wax fraction hydrocracking reactor 50, the liquid hydrocarbons (mainly $C_{11}$ to $C_{20}$) as the kerosene and gas oil fraction drawn from the middle part of the first fractionator 40 are transferred to the kerosene and gas oil fraction hydrotreating reactor 52, and the liquid hydrocarbons (mainly $C_5$ to $C_{10}$) as the naphtha fraction drawn from the upper part of the first fractionator 40 are transferred to the naphtha fraction hydrotreating reactor 54.

The wax fraction hydrocracking reactor 50 hydrocracks the liquid hydrocarbons as the wax fraction with a large carbon number (approximately $C_{21}$ or more), which has been supplied from the bottom of the first fractionator 40, by using the hydrogen gas supplied from the above hydrogen separator 26, to reduce the carbon number to $C_{20}$ or less. In this hydrocracking reaction, hydrocarbons with a small carbon number and with low molecular weight are produced by cleaving the C—C bonds of the hydrocarbons with a large carbon number, using a catalyst and heat. A product including the liquid hydrocarbons hydrocracked in this wax fraction hydrocracking reactor 50 is separated into a gas and a liquid in the vapor-liquid separator 56, the liquid hydrocarbons of which are transferred to the second fractionator 70, and the gas component (including a hydrogen gas) of which is transferred to the kerosene and gas oil fraction hydrotreating reactor 52 and the naphtha fraction hydrotreating reactor 54.

The kerosene and gas oil fraction hydrotreating reactor 52 hydrotreats liquid hydrocarbons (approximately $C_{11}$ to $C_{20}$) as the kerosene and gas oil fractions having a substantially middle carbon number, which have been supplied from the middle part of the first fractionator 40, by using the hydrogen gas supplied via the wax fraction hydrocracking reactor 50 from the hydrogen separator 26. In this hydrotreating reaction, in order to obtain mainly branched chain saturated hydrocarbons, the liquid hydrocarbons are isomerized, and a hydrogen is added to unsaturated bonds of the above liquid hydrocarbons to saturate the liquid hydrocarbons. As a result, a product including the hydrotreated liquid hydrocarbons is separated into a gas and a liquid in the vapor-liquid separator 58, the liquid hydrocarbons of which are transferred to the second fractionator 70, and the gas component (including hydrogen gas) of which is reused for the above hydrogenation reaction.

The naphtha fraction hydrotreating reactor 54 hydrotreats liquid hydrocarbons (approximately $C_{10}$ or less) as the naphtha fraction with a low carbon number, which have been supplied from the upper part of the first fractionator 40, by using the hydrogen gas supplied via the wax fraction hydrocracking reactor 50 from the hydrogen separator 26. As a result, a product including the hydrotreated liquid hydrocarbons is separated into a gas and a liquid in the vapor-liquid separator 60, the liquid hydrocarbons of which are transferred to the naphtha stabilizer 72, and the gas component (including a hydrogen gas) of which is reused for the above hydrogenation reaction.

Next, the second fractionator 70 distills the liquid hydrocarbons supplied from the wax fraction hydrocracking reactor 50 and the kerosene and gas oil fraction hydrotreating reactor 52 as described above. Thereby, the second fractionator 70 separates and refines the liquid hydrocarbons into hydrocarbons (whose boiling point is lower than about 150° C.) with a carbon number of $C_{10}$ or less, kerosene (whose boiling point is about 150 to 250° C.), gas oil (whose boiling point is about 250 to 350° C.), and uncracked wax fraction (whose boiling point is higher than about 350° C.) from the wax fraction hydrocracking reactor 50. The gas oil is drawn from a lower part of the second fractionator 70, and the kerosene is drawn from a middle part thereof. Meanwhile, hydrocarbons with a carbon number of $C_{10}$ or less are drawn from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and second fractionator 70. Thereby, the naphtha stabilizer 72 separates and refines naphtha ($C_5$ to $C_{10}$) as a product. Accordingly, a high-purity naphtha is drawn from a lower part of the naphtha stabilizer 72. Meanwhile, the emission gas (flare gas) other than products, which contains as the main component hydrocarbons with a predetermined carbon number or less ($C_4$ or less), is discharged from the top of the naphtha stabilizer 72.

Figure 2:
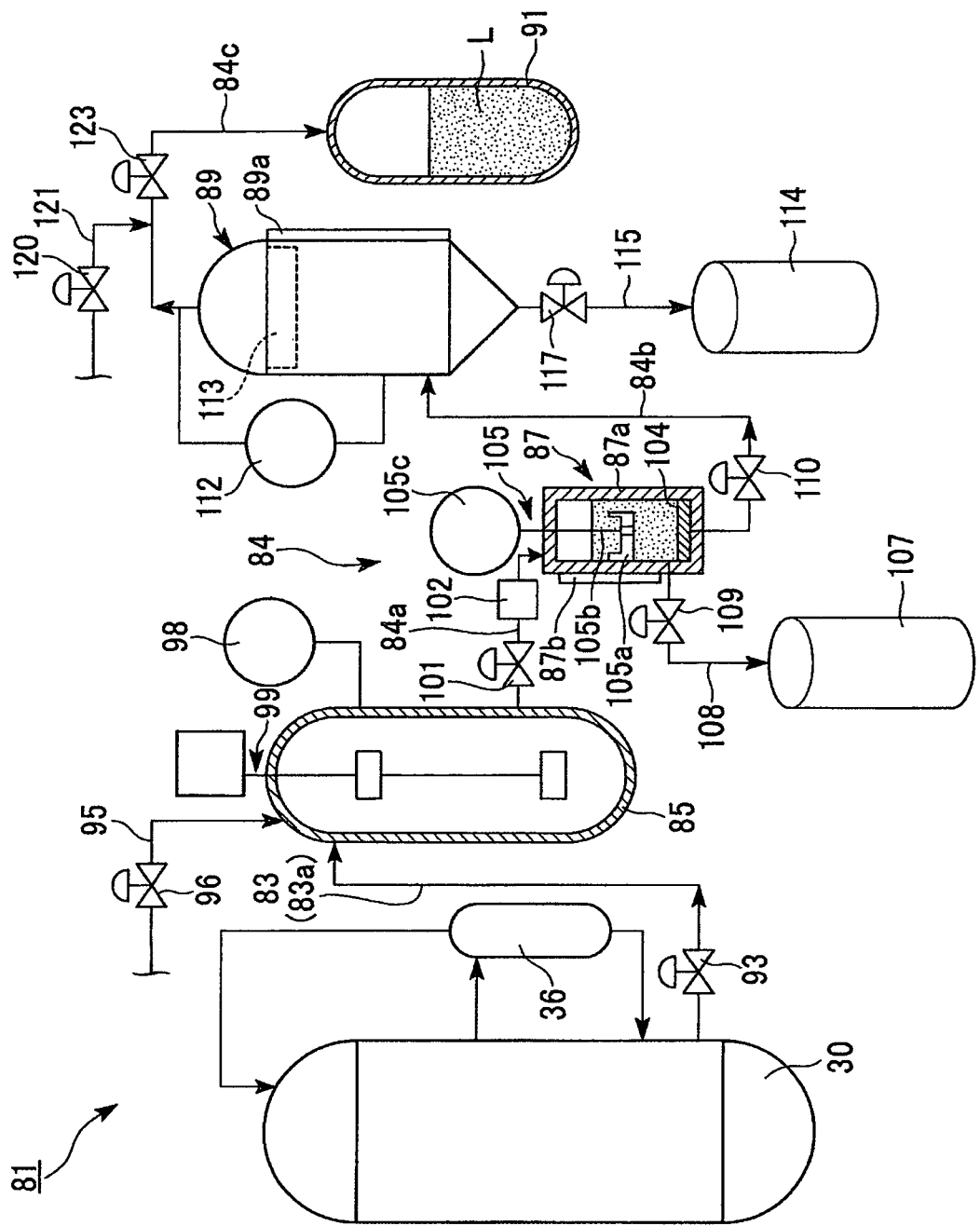
FIG. 2 is a schematic diagram showing the overall configuration of the catalyst separation system of the first embodiment of the present invention.

FIG. 2 shows, for example, the catalyst separation system 81 of the present invention used when individual units of the liquid fuel synthesizing system 1 have stopped their operation as described above.

The catalyst separation system 81 includes the bubble column reactor 30, a first flow line 83 for drawing the slurry including the catalyst particles from the bubble column reactor 30, a storage tank which stores the drawn slurry, i.e., a waste catalyst receiving tank 85, a second flow line 84 for processing the slurry in the waste catalyst receiving tank 85, and a plurality of filters (the details thereof will be described later) provided towards the downstream from the upstream of the second flow line 84.

The first flow line 83 is constituted by a pipe 83a, the second flow line 84 includes pipes 84a, 84b, and 84c, and the waste catalyst receiving tank 85, a first filtering device 87, a second filtering device 89, and a filtrate recovery vessel 91 are provided in this order from the upstream. The bubble column reactor 30 is connected to one end of the pipe 83a, the waste catalyst receiving tank 85 is connected between the other end of the pipe 83a, and one end of the pipe 84a, the first filtering device 87 is connected between the other end of the pipe 84a and one end of the pipe 84b, and the second filtering device 89 is connected between the other end of the pipe 84b and one end of the pipe 84c. The filtrate recovery vessel 91 is connected to the other end of the pipe 84c opposite to its one end to which the second filtering device 89 is connected.

The waste catalyst receiving tank 85 is a tank which temporarily stores the slurry, the first filtering device 87 and the second filtering device 89 are devices which filter solids, such as catalyst particles, from the slurry, and the filtrate recovery vessel 91 is a vessel which holds a filtrate L obtained by filtering the slurry.

A first gate valve 93 for opening and closing the pipe 83a is installed in the pipe 83a connected between the bubble column reactor 30 and the waste catalyst receiving tank 85. The "opening the pipe" referred to here means that the slurry can be made to flow through a pipe, and "closing the pipe" means that the slurry cannot be made to flow through the pipe.

A first nitrogen supply line 95 for supplying nitrogen into the waste catalyst receiving tank 85 is connected to an upper part of the waste catalyst receiving tank 85, and a second gate valve 96 for opening and closing the line is installed in the first nitrogen supply line 95.

A liquid level detector 98 which detects the height of the liquid level of the slurry held inside is attached to the waste catalyst receiving tank 85, and an agitator 99 for agitating the slurry is installed in the waste catalyst receiving tank. In addition, in the liquid level detector 98, a display device (not shown) provided in the liquid level detector may display "HIGH" when the waste catalyst receiving tank 85 is filled with the slurry, and its liquid level becomes higher than a predetermined height, and may display "EMPTY" when the slurry is exhausted from the waste catalyst receiving tank 85.

A third gate valve 101 for opening and closing the pipe 84a, and a measuring instrument 102 for metering the flow rate of the slurry which flows through the pipe 84a are attached to the pipe 84a connected between the waste catalyst receiving tank 85 and the first filtering device 87.

The first filtering device 87 is equipped with a cylindrical vessel body 87a which holds the slurry, a first filter 104 that is a Nutsche filter for filtering the slurry, a liquid level detector 87b which detects the liquid level of the slurry including the catalyst particles in the vessel body 87a, an agitating/discharging device 105 which performs agitation of the slurry, and discharge of the solids filtered by the first filter 104, and a first solid conveyance flow line 108 which conveys the filtered solids to be held in a first waste catalyst drum 107.

The Nutsche filter is generally a filter of the type which performs suctioning and filtering by a vacuum pump or the like from one side of cloth or a wire screen, or a filter of the type which performs filtering by pressurization from the other side, and the first filter 104 of this embodiment is configured such that the mesh thereof is 400 to 800 meshes, i.e., the diameter of pores formed in the first filter 104 is 31 to 63 µm.

The agitating/discharging device 105 has an agitating blade 105a which is disposed within the vessel body 87a to rotate around the axis of the vessel body 87a and move in parallel in the axis direction thereof, a shaft member 105b connected to the agitating blade 105a at one end, and a agitating blade driving motor 105c which is connected to the other end of the shaft member 105b and generates a driving force which rotates or moves the agitating blade 105a.

Further, a valve 109 for opening and closing the first solid conveyance flow line 108 is attached to the first solid conveyance flow line 108.

A fourth gate valve 110 for opening and closing the pipe 84b is installed in the pipe 84b connected between the first filtering device 87 and the second filtering device 89.

The second filtering device 89 includes a differential pressure gage 112 which measures the pressure difference between the inside of the second filtering device and the pipe 84c immediately after the second filtering device 89, a second filter 113 that is a filter made of sintered metal (hereinafter referred to as a "sintered metallic filter") which is disposed inside, and a liquid level detector 89a which detects the liquid level of the slurry in the second filtering device 89. It is possible to form minute pores in the sintered metallic filter, and in this embodiment, the pore diameter of the second filter 113 is set so as to be 10 µm or less, and preferably 5 µm or less. That is, two filters provided in the catalyst separation system 81 are configured so that the pore diameter of the second filter 113 disposed downstream becomes smaller than the pore diameter (31 to 63 µm) of the first filter 104 disposed upstream.

In the differential pressure gage 112, a display device (not shown) provided in the differential pressure gage may display "HIGH" when the second filter 113 is clogged due to the catalyst particles or the like, and the pressure loss between the upstream and the downstream of the second filter 113 is larger than a predetermined value, and may display "LOW" when the pressure loss is smaller than a predetermined value.

A second solid conveyance flow line 115 which conveys the solids filtered by the second filtering device 89 to be held in the second waste catalyst drum 114 is provided under the second filtering device 89. A seventh gate valve 117 for opening and closing the second solid conveyance flow line 115 is provided in the second solid conveyance flow line 115.

In the pipe 84c connected between the second filtering device 89 and the filtrate recovery vessel 91, a second nitrogen supply line 121 which supplies nitrogen into the pipe 84c, and is opened and closed by a sixth gate valve 120 is connected to the downstream of a place where the pressure on the side of the pipe 84c is measured by the differential pressure gage 112, and a fifth gate valve 123 for opening and closing the pipe 84c is installed in the downstream of the second nitrogen supply line 121.

Next, the process of separating and recovering catalyst particles from the slurry by the catalyst separation system 81 configured as described above will be described.

Figure 3:
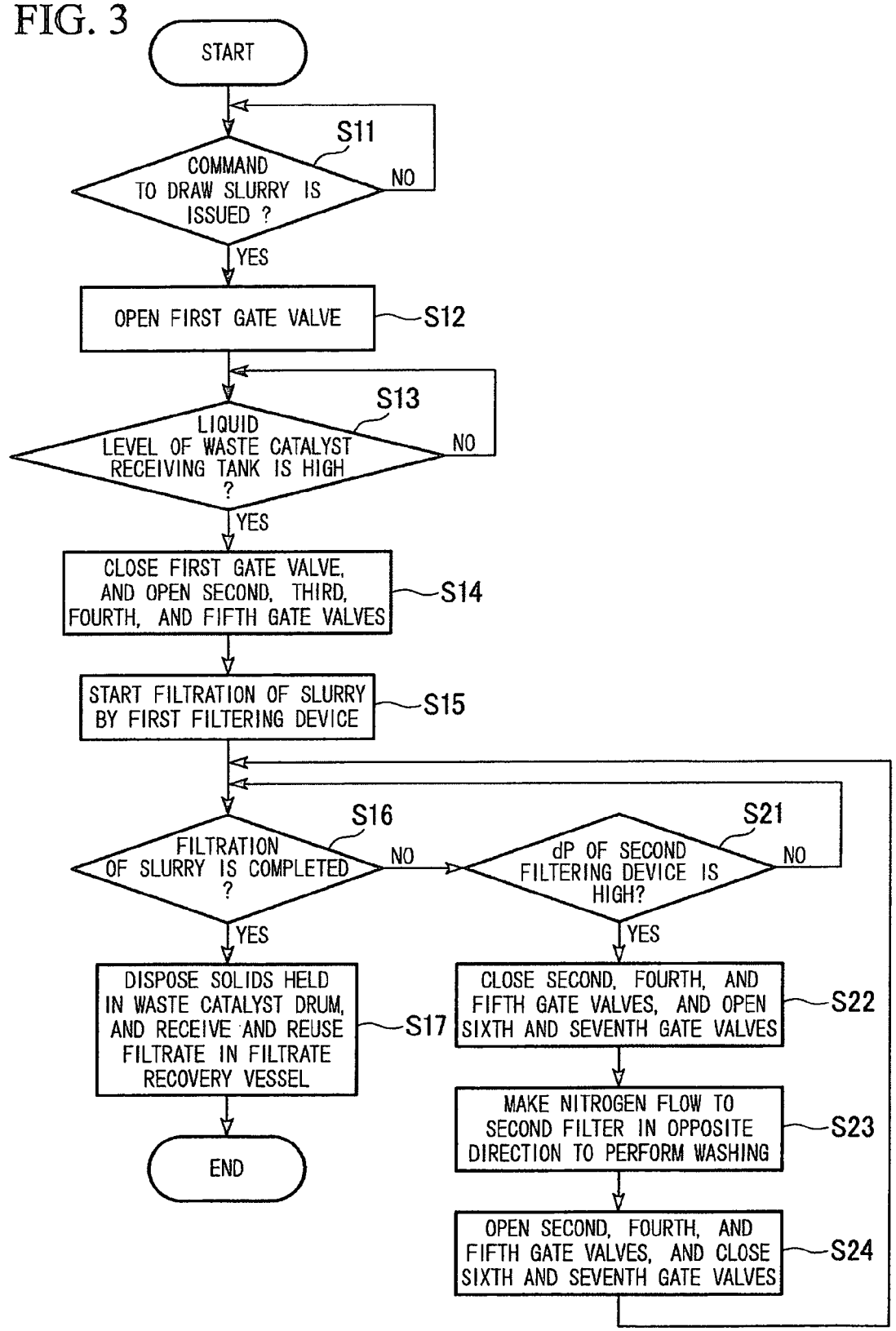
FIG. 3 is a flow chart showing the process of the catalyst separation system of the first embodiment of the present invention.

FIG. 3 is a flow chart showing the process of the catalyst separation system 81. In addition, before the following step starts, the gate valves 93, 96, 101, 110, 117, 120, and 123 and the valve 109 are all in a closed state.

First, Step S11 is repeated until a command to draw the slurry from the bubble column reactor 30 is issued, and the process proceeds to Step S12 when the command to draw the slurry is issued (YES).

Next, in Step S12, the first gate valve 93 is opened to make the slurry flow into the waste catalyst receiving tank 85 through the inside of the pipe 83a from the bubble column reactor 30, the slurry is agitated by the agitator 99, and the process proceeds to Step S13. Then, Step S13 is repeated until the liquid level of the slurry in the waste catalyst receiving tank 85 detected by the liquid level detector 98 is displayed as "HIGH" by the display device, and the process proceeds to Step S14.

In Step S14, the first gate valve 93 is closed, the second gate valve 96, the third gate valve 101, the fourth gate valve 110, and the fifth gate valve 123 are opened, and the process proceeds to Step S15.

At this time, the slurry in the waste catalyst receiving tank 85 is pressurized by the nitrogen which flows into the waste catalyst receiving tank 85 through the first nitrogen supply line 95, and flows into the vessel body 87a of the first filtering device 87 along with the pressurizing nitrogen through the inside of the pipe 84a.

Next, in Step S15, the slurry in the vessel body 87a of the first filtering device 87 is pressed against the first filter 104 by the pressure of the nitrogen, thereby starting filtration. During this period, the agitating blade 105a is rotated by the agitating blade driving motor 105c of the agitating/discharging device 105 to agitate the slurry in the vessel body 87a so that filtration of the slurry is effectively performed.

The filtrate filtered by the first filter 104 flows through the inside of the pipe 84b, and flows into the second filtering device 89 through the fourth gate valve 110. Then, the filtrate is further filtered by the second filter 113 disposed in the second filtering device 89, flows through the inside of the pipe 84c, and flows into the filtrate recovery vessel 91 through the fifth gate valve 123. The filtrate L held in the filtrate recovery vessel 91 contains liquid hydrocarbons as its main component.

Next, in Step S16, it is determined whether or not the filtration of the slurry has been completed. Specifically, when the display device of the liquid level detector 98 displays "EMPTY", and the slurry is no longer detected by the liquid level detector 87b of the first filtering device 87, and the liquid level detector 89a of the second filtering device 89, it is determined that the filtration has been completed (YES), and the process proceeds to Step S17. Further, when the display device of the liquid level detector 98 does not display "EMPTY" or any one of the liquid level detectors 87b and 89a detects the slurry, it is determined that the filtration has not completed (NO), and the process proceeds to Step S21.

In Step S17, solids, such as catalyst particles held in the first waste catalyst drum 107 and the second waste catalyst drum 114, are disposed by a disposal trader or the like or are recovered by a metal recycle dealer, and the filtrate L held in the filtrate recovery vessel 91 is reused as an initial solvent at the time of the next operation of the liquid fuel synthesizing system 1, and all the steps are ended.

In addition, the following processing may be performed before the solids in the first waste catalyst drum 107 are disposed. That is, the agitating blade 105a which is being rotated by the agitating blade driving motor 105c of the agitating/discharging device 105 is made to abut the first filter 104, and the valve 109 is opened. The solids, such as catalyst particles which have remained on the first filter 104, are held in the first waste catalyst drum 107 through the first solid conveyance flow line 108.

Further, in Step S21, it is determined whether or not the display device of the differential pressure gage 112 provided in the second filtering device 89 displays "HIGH". Then, if the display device displays "HIGH" (YES), the process proceeds to Step S22 where the process (which will be described later) of removing the catalyst particles which have clogged the second filter 113 is performed, and if the display device displays "LOW" (NO), the process proceeds to Step S16.

In Step S22, the second gate valve 96, the fourth gate valve 110, and the fifth gate valve 123 are closed, the sixth gate valve 120 and the seventh gate valve 117 are opened, and the process proceeds to Step S23.

Subsequently, in Step S23, the nitrogen is made to flow towards the second solid conveyance flow line 115 through the second filter 113 in the second filtering device 89 from the second nitrogen supply line 121, and the process proceeds to Step S24. The direction in which the nitrogen is made to flow becomes a direction opposite to the direction in which the slurry including the catalyst particle flows into the second filter 113 until then, and solids, such as catalyst particles caught by the second filter 113, are pushed by the nitrogen which is made to flow, and are held in the second waste catalyst drum 114 through the second solid conveyance flow line 115.

Subsequently, in Step S24, the preparation of making the next slurry flow to the catalyst separation system 81 is made by opening the second gate valve 96, the fourth gate valve 110, and the fifth gate valve 123, and closing the sixth gate valve 120 and the seventh gate valve 117.

As such, according to the catalyst separation system of the first embodiment of the present invention, the slurry including the catalyst particles can be filtered twice in total by the first filter 104 and the second filter 113 provided from the upstream of the second flow line 84 to the downstream thereof. For this reason, when the catalyst particles are separated and recovered from the slurry including the liquid hydrocarbons, the catalyst particles can be prevented from being mixed into the liquid hydrocarbons to be recovered, and deterioration of hydrocarbon products can be suppressed. Accordingly, it is possible to improve the quality of hydrocarbons obtained by filtration. Further, since the catalyst particles are separated from the slurry by the two filters 104 and 113, it is possible to keep the catalyst separation system 81 from being enlarged as a whole without using large-sized apparatuses, such as a heat chamber and a cooling tower.

Further, if all the pore diameters of the first filter 104 and the second filter 113 are the same, the catalyst particles will first clog the pores of the first upstream filter 104. The catalyst separation system 81 of the present invention is configured so that the pore diameter (10 μm or less) of the second filter 113 disposed downstream becomes smaller than the pore diameter (31 to 63 μm) of the first filter 104 disposed upstream. For this reason, although the catalyst particles with a relatively small external diameter which have passed through the pores of the first filter 104 clog the second filter 113, the external diameter of catalyst particles to be clogged will differ depending on filters like that larger catalyst particles than the pore diameter of the first filter 104 clog the first filter 104 with a large pore diameter. Accordingly, catalyst particles can be prevented from clogging the first upstream filter 104 unevenly, and thus, hydrocarbons including the catalyst particles can be prevented from blocking the second flow line 84 to hinder flow.

(Second Embodiment)

Next, although the second embodiment according to the present invention will be described, the description of the same parts as the above first embodiment will be omitted by giving the same reference numerals thereof, and only different points will be described.

Figure 4:
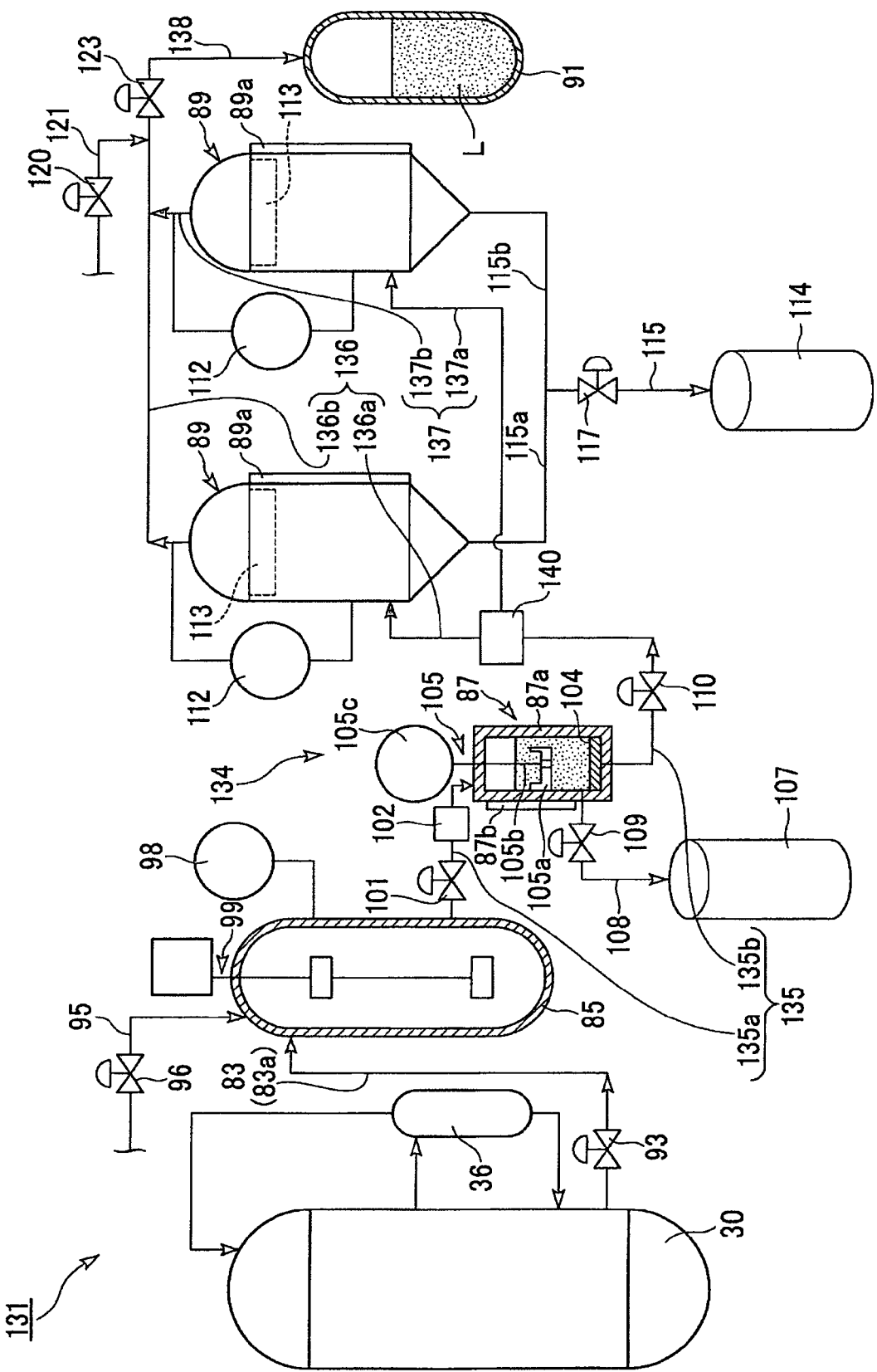
FIG. 4 is a schematic diagram showing the overall configuration of a catalyst separation system of a second embodiment of the present invention.

As shown in FIG. 4, in a catalyst separation system 131 of this embodiment, a second flow line 134 constituted by an upstream main flow line (main line) 135 connected to the waste catalyst receiving tank 85, two branch flow lines 136 and 137 which branch from the upstream main line 135, and a downstream main line 138 which puts the two branch flow lines 136 and 137 into one on the downstream side is provided instead of the second flow line 84 provided in the above embodiment. That is, a portion of a flow line from the waste catalyst receiving tank 85 to the filtrate recovery vessel 91 branches in parallel.

The mainstream flow line 135 includes pipes 135a and 135b. The waste catalyst receiving tank 85 is connected to one end of the pipe 135a, and the first filtering device 87 is connected between the other end of the pipe 135a, and one end of the pipe 135b. The branch flow line 136 includes pipes 136a and 136b, and the branch flow line 137 includes pipes 137a and 137b.

A switching device 140 which can perform switching so that the slurry which flows through the pipe 135b is made to flow to any one of the pipe 136a and the pipe 137a is disposed between the other end of the pipe 135b of the upstream main flow line 135, and one end of the pipe 136a of the branch flow line 136 and one end of the pipe 137a of the branch flow line 137. That is, a switching device is provided for making the slurry selectively flow into any one of the individual branch flow lines which branch in parallel.

Further, instead of the second filtering device 89 provided in the catalyst separation system 81 in the above first embodiment, in this embodiment, the second filtering devices 89 are between the other end of the pipe 136a and one end of the pipe 136b and between the other end of the pipe 137a and one end of the pipe 137b, respectively, and second filters 113 that are sintered metallic filters are provided in the second filtering device 89.

According to the catalyst separation system 131 configured as described above, for example, when catalyst particles clog the pores of the filter 113 and it becomes difficult for the slurry to flow while the slurry is made to flow to one branch flow line 136, it is possible to switch the branch flow lines which allows the slurry to flow from the branch flow line 136 to the branch flow line 137 by the switching device 140.

Accordingly, when the catalyst particles have clogged the pores of the filter 113 of the branch flow line 136, replacement with a new filter 113 of the branch flow line 137 can be made without stopping the flow of the slurry.

In addition, in this embodiment, only the second filtering device 89 provided with the second filter 113 is connected to each of the branch flow lines 136 and 137. However, all the filters in the catalyst separation system 131 can be connected to each of the branch flow lines 136 and 137. That is, the first filtering device 87 including the first filter 104 and the second filtering device 89 including the second filter 113 may be connected to the branch flow lines 136 and 137, respectively.

Further, in this embodiment, although the catalyst separation system 131 has two branch flow lines, the system may have three or more branch flow lines.

Although the first and second embodiments of the present invention have been described hitherto in detail with reference to the drawings, concrete configurations are not limited to the embodiments, and the present invention also includes changes or the like in configuration without departing from the scope and spirit of the present invention.

For example, the above first and second embodiments are configured such that the pore diameter of the second filter 113 becomes smaller than the pore diameter of the first filter 104. However, the pore diameter of the first filter 104 may be the same as the pore diameter of the second filter 113, and the pore diameter of the first filter 104 may be smaller than the pore diameter of the second filter 113.

Further, in the above first and second embodiments, two kinds of filters including the first filter 104 and the second filter 113 are provided from the upstream of the catalyst separation system to the downstream thereof. However, three or more kinds of filters may be provided.

Further, in the above first and second embodiments, the second filter 113 may be the Nutsche filter or the like, not limited to the sintered metallic filter.

INDUSTRIAL APPLICABILITY

The catalyst separation system of the present invention can suppress the enlargement of apparatuses, and deterioration of the hydrocarbons, thereby separating and recovering the catalyst particles from the slurry including the liquid hydrocarbons.

DESCRIPTION OF REFERENCE NUMERALS

30: BUBBLE COLUMN REACTOR (REACTOR BODY)
81, 131: CATALYST SEPARATION SYSTEM
83: FIRST FLOW LINE
84, 134: SECOND FLOW LINE
85: WASTE CATALYST RECEIVING TANK (STORAGE TANK)
104: FIRST FILTER (FILTER)
113: SECOND FILTER (FILTER)
135: UPSTREAM MAIN FLOW LINE (MAIN LINE)
136, 137: BRANCH FLOW LINE
140: SWITCHING DEVICE

The invention claimed is:

1. A catalyst separation system for separating catalyst particles from liquid hydrocarbons synthesized by a Fischer-Tropsch synthesis reaction of a synthesis gas including a hydrogen and a carbon monoxide as the main components, and a slurry having solid catalyst particles suspended in a liquid, the catalyst separation system comprising:
a reactor;
a storage tank for storing the slurry drawn from the reactor;
a first filtering device which is equipped with a vessel body and a first filter positioned at the bottom of the inside of the vessel body, and is configured to filter the slurry supplied to the vessel body from the storage tank in the vessel body;
a first pipeline provided between the storage tank and the vessel body of the first filtering device for feeding the slurry from the storage tank to the vessel body, one end of the first pipeline being connected to the upper section of the vessel body;
a second filtering device which is equipped with a second filter of which the mesh size is smaller than that of the first filter, and is configured to filter a filtrate supplied to the second filtering device from the first filtering device;
a second pipeline provided between the vessel body of the first filtering device and a vessel body of the second filtering device for feeding the filtrate filtered by the first filter from the first filtering device to the second filtering device, one end of the second pipeline being connected to the lower section of the vessel body of the first filtering device and the other end being connected to the lower section of the vessel body of the second filtering device;
a filtrate recovery vessel for recovering the filtrate which has passed through the first and second filtering devices;
a third pipeline provided between the vessel body of the second filtering device and the filtrate recovery vessel for feeding the filtrate filtered by the first and second filtering devices from the second filtering device to the filtrate recovery vessel, one end of the third pipeline being connected to the upper section of the vessel body of the second filtering device;
a first nitrogen supply line which is connected to the storage tank and is configured to supply nitrogen gas to the vessel body of the first filtering device via the storage tank so as to press the slurry against the first filter; and
an agitating device configured to perform agitation of the slurry in the vessel body when the slurry is pressed by the nitrogen gas;
wherein the pore diameter of the first filter of the first filtering device is 31 to 63 μm; and the pore diameter of the second filter of the second filtering device is 10 μm or less.

2. The catalyst separation system according to claim 1, wherein
at least one of the first and second filtering devices is a Nutsche filter.

3. The catalyst separation system according to claim 1, wherein
the second filter of the second filtering device is made of sintered metal.

4. The catalyst separation system according to claim 1, further comprising
a plurality of second filtering devices which filter the slurry which has passed through the first filtering device, wherein the first and second filtering devices are disposed in series in a flow line for the slurry from the storage tank to the filtrate recovery vessel,
a portion of the flow line branches in parallel, the second filtering devices are respectively provided in branched flow lines, and
a switching device is provided in the flow line such that the slurry is selectively flowed into the second filtering devices.

5. The catalyst separation system according to claim 1, further comprising
a second nitrogen supply line which is connected to the upper section of the vessel body of the second filtering device and is configured to supply nitrogen gas to the vessel body of the second filtering device while flushing the second filter.

6. The catalyst separation system according to claim 1, wherein
the slurry is pressurized by the nitrogen gas which flows into the storage tank so that the slurry flows to the filtrate recovery vessel through the first and second filtering devices with the pressurized nitrogen gas.

\* \* \* \* \*

UNITED STATES PATENT AND TRADEMARK OFFICE
CERTIFICATE OF CORRECTION

| | | |
|---|---|---|
| PATENT NO. | : 9,139,779 B2 | Page 1 of 1 |
| APPLICATION NO. | : 12/998217 | |
| DATED | : September 22, 2015 | |
| INVENTOR(S) | : Onishi et al. | |

It is certified that error appears in the above-identified patent and that said Letters Patent is hereby corrected as shown below:

In the specification

Column 3, line 56, change "system of a fust embodiment" to -- "system of a first embodiment" --; and Column 5, line 6, change "(PDX)" to -- "(POX)" --; and Column 10, line 14, change "Iess ($C_4$ or less)," to -- "less ($C_4$ or less)," --.

Signed and Sealed this
Second Day of August, 2016

Michelle K. Lee
*Director of the United States Patent and Trademark Office*